US007453405B2

(12) United States Patent
Nishikido et al.

(10) Patent No.: US 7,453,405 B2
(45) Date of Patent: Nov. 18, 2008

(54) PORTABLE WIRELESS DEVICE

(75) Inventors: Tomoaki Nishikido, Ishikawa (JP); Yutaka Saito, Ishikawa (JP); Yoshio Koyanagi, Kanagawa (JP); Kiyoshi Egawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 58 days.

(21) Appl. No.: 11/597,706

(22) PCT Filed: May 24, 2005

(86) PCT No.: PCT/JP2005/009469

§ 371 (c)(1),
(2), (4) Date: Nov. 28, 2006

(87) PCT Pub. No.: WO2005/117291

PCT Pub. Date: Dec. 8, 2005

(65) Prior Publication Data

US 2007/0216584 A1   Sep. 20, 2007

(30) Foreign Application Priority Data

May 31, 2004   (JP)   ............................. 2004-162157

(51) Int. Cl.
*H01Q 1/24*   (2006.01)
*H01Q 1/38*   (2006.01)
*H01Q 21/00*   (2006.01)

(52) U.S. Cl. ............................... 343/702; 343/700 MS; 343/879

(58) Field of Classification Search .......... 343/700 MS, 343/702, 876, 860, 879
See application file for complete search history.

(56) References Cited

U.S. PATENT DOCUMENTS 6,281,850 B1 *  8/2001  Klostermann ................ 343/702
6,295,462 B1 *  9/2001  Kudoh ........................ 455/41.3

(Continued)

FOREIGN PATENT DOCUMENTS

JP          11122033         4/1999

(Continued)

OTHER PUBLICATIONS

PCT International Search Report dated Jul. 12, 2005.

*Primary Examiner*—Shih-Chao Chen
(74) *Attorney, Agent, or Firm*—Dickinson Wright, PLLC

(57) ABSTRACT

A portable wireless device realizing high-speed transmission in downlink communication in a used state that a foldable portable wireless device is held in a hand of the user and ensuring a high antenna radiation efficiency. In the portable wireless device, platy conductors (1, 3, 4) are arranged in the longitudinal direction on the back of a display section (35) of an upper case (5). The signal of a transmission circuit (25) is distributed by a power distributor (18). One signal is fed to a platy conductor (1) through a phase shifter (17) and the other is fed to the platy conductor (3) or the platy conductor (4) from a high-frequency switch (19) through a transmission/reception duplexer (20) or a transmission/reception duplexer (21). The high-frequency switch (19) selectively feeds power to either the platy conductor (3) or the platy conductor (4) according to the signal from a gravity sensor (26). The received signal is extracted by the transmission/reception duplexers (20, 21), amplified by a receiving circuit (22) and a receiving circuit (23), and multiplied by a predetermined weight coefficient by a demodulating section (24) and combined.

7 Claims, 11 Drawing Sheets

U.S. PATENT DOCUMENTS

| | | | |
|---|---|---|---|
| 2002/0058483 A1 | 5/2002 | Shinichi et al. | 455/90 |
| 2003/0189514 A1 | 10/2003 | Miyano et al. | 342/372 |
| 2005/0119035 A1 | 6/2005 | Miyano et al. | 455/575.7 |
| 2005/0239519 A1 | 10/2005 | Saitou et al. | 455/575.1 |
| 2007/0080872 A1* | 4/2007 | Nishikido et al. | 343/702 |

FOREIGN PATENT DOCUMENTS

| | | |
|---|---|---|
| JP | 11284424 | 10/1999 |
| JP | 2002 064314 | 2/2002 |
| JP | 2002 077006 | 3/2002 |
| JP | 2002 152115 | 5/2002 |
| JP | 2004 56426 | 2/2004 |
| JP | 2004 140815 | 5/2004 |
| WO | 2003 023955 | 3/2003 |

\* cited by examiner

PORTABLE WIRELESS DEVICE

TECHNICAL FIELD

The present invention relates to a mobile radio apparatus having a foldable structure.

BACKGROUND ART

The foldable mobile phone widely used recently is used in many cases for email or as a TV telephone, and further, is used to download a variety of information, such as music and video images, by using the Internet as well as being used as a voice phone to carry out voice communication. In particular, when a user downloads a large volume of images, it is important to increase the transmission rate of the downlink communication of the mobile phone (that is, the communication from the telephone station to the user terminal). In the communication system of the CDMA (Code Division Multiple Access) scheme now in service widely, the maximum transmission rate of downlink communication is 384 kbps and, with such a communication rate, a considerable time and communication cost are required if the user downloads a large volume of moving images etc.

Now, in the HSDPA (High Speed Downlink Packet Access), which is one of the high speed packet communication techniques being developed recently, even when a frequency bandwidth of 5 MHz is used, which is the same as the current CDMA scheme, it is possible to realize high speed communication of up to 14.4 Mbps that is more than five times the current communication speed. By this means, by using the HSDPA, even when downloading a large volume of images, it is possible to perform the process in a short time and at a low communication cost. The adaptive modulation scheme is important in order to increase the communication speed in this way. The adaptive modulation scheme is one, in which a fluctuating condition of a radio channel, that is, a change in the degree of radio wave propagation in the air is determined comprehensively and the most optimum modulation scheme is selected automatically. Specifically, a low-rate modulation scheme is used when the reception condition of radio waves is poor, and a high-rate modulation scheme is used when the reception condition is good. Therefore, in order to realize the HSDPA, improvement in reception performance in a multipath propagation environment of a mobile phone is important. For this reason, in order to improve such reception performance, improvement in reception performance is realized by allowing the base station to be mounted a plurality of antennas and reception system circuits and perform combining reception.

On the other hand, when carrying out voice communication using a mobile phone or when performing data communication such as an email or a TV telephone, a state in which a user holds the mobile phone in the hand and carries out voice communication by placing the mobile phone near the ear (hereinafter, referred to as a "voice communication state") or a state in which a user holds the mobile phone in front of the user's chest to perform email operations (hereinafter, referred to as an "operation state") is general. For such a variety of use states, an antenna switching diversity operation is utilized, in which a plurality of antennas provided at comparatively distant portions from the mobile phone main body are switched in accordance with the use state. With such an antenna switching diversity scheme, however, it is difficult to realize a high speed transmission in downlink communication.

Therefore, in order to cope with such a challenge in high speed transmission, techniques that have made various improvements to an antenna of a mobile phone have been proposed. For example, in patent document 1 below, a configuration is proposed, in which a plurality of antennas are incorporated inside a mobile phone and power is distributed to the antennas. In addition, in patent document 2 below, a configuration is proposed, in which two dipole antennas are provided in parallel inside a mobile phone and feeding phases of the dipole antennas are controlled. Further, in patent document 3 below, a configuration is proposed, in which a helical antenna outside a mobile phone and an antenna built in a flip are provided, and feeding phases of the antennas are controlled. These techniques of the patent publications also take measures to reduce influences of radio waves on a human body.

Patent Document 1: Japanese Patent Application Laid-open No. 2002-77006
Patent Document 2: Japanese Patent Application Laid-open No. 2002-152115
Patent Document 3: Japanese Patent Application Laid-open No. 2002-64314

DISCLOSURE OF INVENTION

Problems to be Solved by the Invention

However, with the configuration as in the above-mentioned patent document 1, in which a plurality of antennas are mounted on a mobile phone and power is distributed, although improved effects of the communication performance is expected by controlling the feeding phase and the feeding power of tiny antennas by adjusting a composite radiation pattern to optimum, the high speed transmission in downlink communication is not taken into consideration. Further, when holding a mobile phone in the hand at a tilt and using it in a general voice communication state, proper positions to arrange antennas or a method of controlling the antennas in order to prevent degradation in propagation performance due to the influence of shoulders and a head are not taken into consideration. Further, with the configuration of the two dipole antennas as in the above-mentioned patent document 2, although the improved effects of the communication performance due to the directivity control in the phase control of a phase angle of 180° is shown, like in patent document 1, the high speed downlink transmission, the proper positions to arrange antennas or the method of controlling the antennas in order to prevent degradation in propagation performance are not taken into consideration.

Moreover, with the configuration in which the external helical antenna and the flip built-in antenna are arranged as in the above-mentioned patent document 3, although the change in directivity by the phase control is shown when the flip is open, directivity control cannot be performed when the flip is in a closed state. Therefore, the problem that the antenna radiation efficiency tends to deteriorate is not solved. Further, there is also a problem that the design of the mobile phone is not good from the commercial standpoint because the helical antenna protrudes to the outside.

It is therefore an object of the present invention to provide a mobile radio apparatus that realizes high speed transmission in downlink communication and that, in addition, ensures high antenna radiation efficiency and improves communication performance in a variety of use states of various types of mobile radio apparatuses, in particular, foldable mobile phones.

Means for Solving the Problem

A mobile radio apparatus of the present invention is a mobile radio apparatus that performs transmission and reception of radio waves by combining a plurality of antenna elements and adopts a configuration having: a first antenna element that is arranged along the longer side of a case; a second antenna element and a third antenna element which are arranged along the longer side of the case and have different excitation phases from the first antenna element; a transmission system control section that controls a pattern of the radiation directivity by changing a phase difference between an excitation phase of the first antenna element and an excitation phase of the second antenna element or the third antenna element; and a reception system control section that performs adaptive combining of received signals in accordance with the reception state of the first antenna element, the second antenna element, and the third antenna element.

Advantageous Effect of the Invention

According to the present invention, for example, when an antenna of a mobile radio apparatus is formed with three antenna elements, if the second antenna element or the third antenna element is selected in conjunction with the voice communication state, it is possible in the transmission system to optimally control the antenna directivity by providing a predetermined phase difference between the selected antenna element (for example, the second antenna element) and the first antenna element and feeding the antenna elements. By this means, it is possible to ensure high antenna radiation efficiency with respect to the radio waves in the required direction. Further, in the reception system, it is possible to improve the reception performance and perform high speed transmission in downlink communication by performing combining reception diversity in accordance with the reception state of the second antenna element or the third antenna element.

In addition, according to the present invention, a combining section (that is, a demodulator) performs adaptive combining of signals by assigning a desired weight in accordance with the reception states of received signals from the first antenna element, the second antenna element, and the third antenna element. By this means, it is possible to maintain reception performance in an excellent state, and therefore, it is possible to realize high speed transmission in downlink communication.

Further, according to the present invention, a selection switching section selects the second antenna element or the third antenna element in conjunction with the voice communication state, thereby the selected antenna element (for example, the second antenna element) and the first antenna element excite with a predetermined phase difference, so that it is possible to ensure high antenna radiation efficiency by increasing the antenna directivity in a desired direction in the transmission system. At this time, in the reception system, it is possible to perform high speed transmission in downlink communication by increasing reception performance by reception combining of two antenna elements (for example, the second antenna element and the first antenna element).

Furthermore, according to the present invention, an inclination detection section detects the use state from the inclination angle of the mobile radio apparatus, so that it is possible in the transmission system to perform directivity control in the required direction of radio waves in various use states (that is, a voice communication state where voice communication is being carried out or an operation state where email operations are being performed). Accordingly, it is possible to ensure excellent communication performance even in any use state. For example, in the voice communication state in which a mobile radio apparatus (mobile phone) is held in the right hand and voice communication is carried out, or in the operation state in which a mobile radio apparatus is held in the left hand and email operations are performed, the inclination detection section detects the inclinations of the mobile radio apparatus in the use states, thereby ensuring the maximum radio wave directivity and maintaining excellent communication performance.

Still furthermore, according to the present invention, when a foldable mobile phone is used, the directivity of a radio wave is controlled by automatically changing the feeding phase of two or more antenna elements in accordance with the use state or the reception state of the foldable mobile phone, so that it is possible to perform the optimum directivity control with respect to a direction of a required radio wave. By this means, it is possible to maintain the optimum transmission performance in accordance with the use state of the foldable mobile phone, and therefore it is possible to further improve the transmission performance, compared to the conventional foldable mobile phone. On the other hand, when reception is performed, high speed transmission in downlink communication can be ensured by the reception combining scheme. Accordingly, by means of the present invention, it is possible to configure a foldable mobile phone of high communication quality.

BEST MODE FOR CARRYING OUT THE INVENTION

Figure 1:
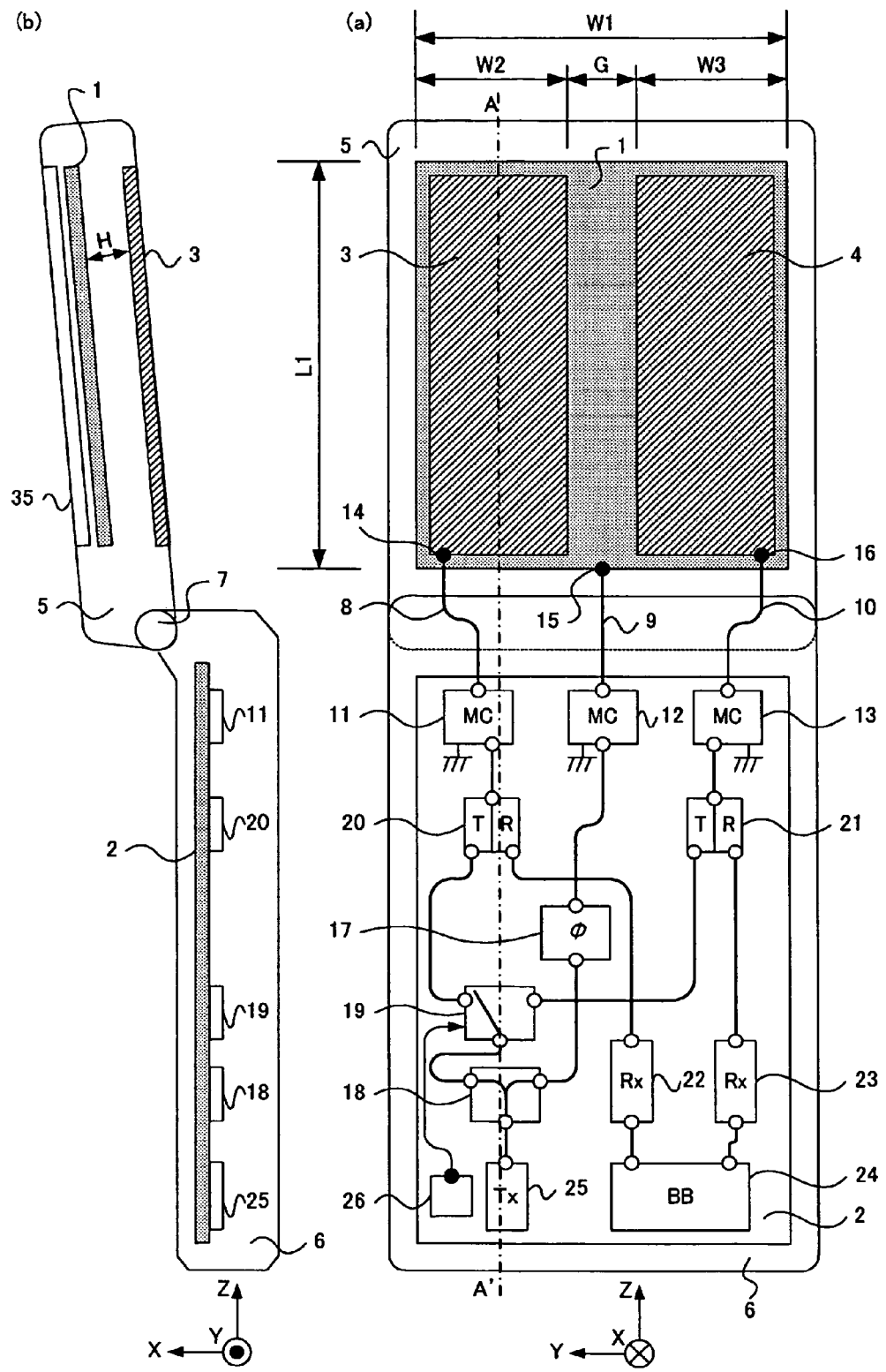
FIG. 1 is a configuration diagram of a foldable mobile phone in embodiment 1 of the present invention.

With regard to a mobile radio apparatus of the present invention, several embodiments will be explained below with reference to accompanying drawings by using an example of a foldable mobile phone. Here, the same symbols are attached to the same components in the drawings used in the embodiments below and the duplicated explanation will be omitted. Further, a mobile phone of the present invention does not have to be a foldable structure, and the present invention can be realized even with a sliding structure or non-foldable fixed structure.

The essential feature of the mobile radio apparatus (that is, mobile phone) of the present invention is that, in the transmission system, high antenna radiation efficiency can be ensured by detecting the inclination of the mobile phone in various use states, selectively combining two antenna elements having different signal phases based on the detection result, and performing a directivity control toward the direction of required radio wave. Further, in the reception system, by improving reception performance by means of adaptive combining of received signals of the two antenna elements, high speed transmission in downlink communication is realized. By this means, it is possible to realize a mobile radio apparatus (mobile phone) that is able to ensure excellent communication performance.

EMBODIMENT 1

FIG. 1 is a configuration diagram of a foldable mobile phone of Embodiment 1 of the present invention, and FIG. 1(a) is a back perspective view of the foldable mobile phone when viewed from the backside and FIG. 1(b) is an A-A' section view in FIG. 1(a). In other words, FIG. 1 shows a front view and a side view of a state in which the mobile phone having a foldable structure is opened to use (hereinafter, referred to an "open state"). The foldable mobile phone has a configuration including upper case 5, lower case 6, hinge section 7, flat conductor 1 (first antenna element), flat conductor 3 (second antenna element), flat conductor 4 (third antenna element), ground plate 2, and display section 35. In the description below, the foldable mobile phone may be simply referred to as a "mobile phone" in some cases.

Upper case 5 corresponding to the upper housing and lower case 6 corresponding to the lower housing are made of resin that is an insulator, and, in general, upper case 5 and lower case 6 are set, to have a length of about 100 mm and a width of about 50 mm. In addition, upper case 5 and lower case 6 are rotatably connected with the hinge section 7 as a supporting point, thus forming a foldable structure. Further, flat conductor 1 that is equivalent to the flat antenna element is made of, for example, a copper plate having length L1 of about 70 mm and width W1 of about 45 mm and is arranged along the surface in the longitudinal direction of the backside surface of the display section 35 inside upper case 5. Furthermore, flat conductor 3 and flat conductor 4 corresponding to the flat antenna element are made of, for example, copper plates having a length L1 of about 70 mm and a width W2 and a width W3 of about 20 mm, and arranged along the surface separated from the backside surface of the display section 35 inside upper case 5 (that is, the opposite surface of the backside surface of upper case 5).

In addition, distance G between flat conductor 3 and flat conductor 4 is set to, for example, about 5 mm. Further, distance H between flat conductor 1 and flat conductor 3 and between flat conductor 1 and flat conductor 4 is set to, for example, about 5 mm. Further, the thickness of flat conductor 1, flat conductor 3, and flat conductor 4 is set to, for example, about 0.1 mm. By this means, it is possible to arrange flat conductors 1, 3, and 4 inside thin upper case 5 having a thickness of, for example, about 7 mm in such a manner that they do not interfere structurally with other component parts such as the display element.

Further, ground plate 2 is a conductive plate having, for example, a length of about 90 mm and a width of about 45 mm, and, in general, the ground pattern for circuits arranged inside lower case 6 is utilized. On ground plate 2, the ground pattern, which is the ground potential for circuits, is formed over substantially the entire surface. Further, one end of matching circuit 11, matching circuit 12, and matching circuit 13 is grounded to the ground pattern of ground plate 2 and is maintained at the ground potential. Furthermore, feeding point 14, feeding point 15, and feeding point 16 provided at one end (for example, the lower part side of upper case 5) of flat conductor 1, flat conductor 3, and flat conductor 4 are electrically connected to matching circuit 11, matching circuit 12, and matching circuit 13 by feeder line 8, feeder line 9, and feeder line 10. A flexible wire material that can be bent freely is used for feeder line 8, feeder line 9, and feeder line 10, and, by this means, upper case 5 is configured so as to be rotatable at hinge section 7.

A high frequency signal transmitted from transmission circuit 25 is distributed by power distributor 18, and one of the distributed high frequency signals is fed from the matching circuit 12 to flat conductor 1 via phase shifter 17 and the other distributed high frequency signal is fed to high frequency switch 19. Further, the other high frequency signal is fed from one contact of high frequency switch 19 to flat conductor 3 via duplexer 20 for using one antenna for both transmission and reception, and the matching circuit 11. The other high frequency signal is also fed from the other contact of high frequency switch 19 to flat conductor 3 via duplexer 21 and matching circuit 13. High frequency switch 19 is configured with, for example, an FET or a PIN diode. Further, matching circuit 11, matching circuit 12, and matching circuit 13 have a function of matching the impedance of flat conductor 1, flat conductor 3, and flat conductor 4 to the circuit impedance of transmission circuit 25, reception circuit 22, and reception circuit 23, respectively. In general, matching circuits 11, 12, and 13 are matched at an impedance of 50 Ω.

In addition, the mobile phone generates a selection signal for switching and controlling high frequency switch 19 based on a signal from gravity sensor (inclination detection section) 26 for detecting inclination of the subject or a reception level from demodulator 24, high frequency switch 19 has a function of switching between matching circuit 11 and matching circuit 13 based on this selection signal and feeding a high frequency signal to either flat conductor 3 or flat conductor 4. Gravity sensor 26 has a configuration in which, for example, a weight is hung from the tip of a flexible distortion gauge, one end of which is fixed at a predetermined place inside the mobile phone. By this means, when the mobile phone is inclined, an electromotive force is generated by piezo effect of the distortion gauge that is bent by the weight, and, therefore, by detecting the electromotive force, the degree of the inclination of the mobile phone can be detected.

Power distributor 18 is, for example, a distributor for high frequency signals configured by a Wilkinson-type circuit utilizing the principles of a λ/4 impedance converter and having high frequency performance, and has a function of distributing a high frequency signal from transmission circuit 25 at the same amplitude and in the same phase. Phase shifter 17 is a circuit configured with, for example, a concentrated constant element or a distributed constant element and has a function of making the phase of a high frequency signal to be fed to matching circuit 11 or matching circuit 13 different from the phase to be fed to matching circuit 12. By means of the above configuration, flat conductor 1, flat conductor 3, and flat conductor 4, and ground plate 2 operate as a dipole antenna for which feeding is performed simultaneously in different phases.

Further, in the reception system, a received signal is taken out by duplexer 20 from feeding point 14 provided on one end of flat conductor 3 via matching circuit 11 and is amplified in reception circuit 22. Further, a received signal is taken out by duplexer 21 from feeding point 16 provided on one end of flat conductor 4 via matching circuit 13 and is amplified in reception circuit 23. Then, the received high frequency signals amplified in reception circuit 22 and reception circuit 23 are assigned a predetermined weighting factor by demodulator 24 and then combined.

To summarize the above, the mobile phone in Embodiment 1 shown in FIG. 1 has fundamentally the following configuration. In other words, the mobile phone of the present invention has a configuration having: flat conductor 1 arranged along the longer side of the case; flat conductor 3 and flat conductor 4 similarly arranged along the longer side of the case and having different excitation phase from flat conductor 1; the transmission system control means that controls a pattern of radiation directivity by changing a phase difference between the excitation phase of flat conductor 1 and the excitation phase of flat conductor 3 or flat conductor 4; and reception system control means that performs adaptive combining of received signals in accordance with the reception state of flat conductor 1, flat conductor 3, and flat conductor 4.

Further, the transmission system control means has a configuration having: transmission circuit 25 that outputs a high frequency signal; power distributor 18 that distributes the high frequency signal outputted from transmission circuit 25 to flat conductor 1, flat conductor 3, and flat conductor 4; phase shifter 17 that changes the phase difference between the excitation phase of flat conductor 1 and the excitation phase of flat conductor 3 or flat conductor 4; high frequency switch 19 that selectively switches distribution routes of a high frequency signal in accordance with the use state of the mobile phone; and gravity sensor 26 that detects the use state of the mobile phone by an inclination angle of the mobile phone. Further, reception system control means has a configuration having: reception circuit 22: and reception circuit 23 that receives and amplifies high frequency signals from a plurality of antenna elements that contribute to the reception system; and demodulator 24 that assigns predetermined weighting to the high frequency signals outputted from reception circuit 22 and reception circuit 23 and perform adaptive combining of the signals.

At the bottom of the back view of the mobile phone shown in FIG. 1(*a*), and at the bottom of the A-A' section view (that is, the side view) shown in FIG. 1(*b*), coordinate systems are shown. For example, in the back view in FIG. 1(*a*), a coordinate system is shown, in which the forefinger, the middle finger, and the thumb of the right hand all perpendicular to each other, represents the X axis direction (direction from the front side of the paper to the back side of the paper of the figure), Y direction(direction from the right to the left in the figure), and Z direction(direction from the bottom to the top in the figure), respectively. Therefore, in the side view in FIG. 1(*b*), the coordinate system is in a state in which the right hand is rotated by 90 degrees in the clockwise direction, in which the X axis direction of the middle finger is the direction from the right to the left in the figure and the Y axis direction of the thumb is the direction from the back side to front side of the paper in the figure. The Z axis direction of the forefinger is the same as in the back view, and is the direction from the bottom to the top in the figure.

Figure 2:
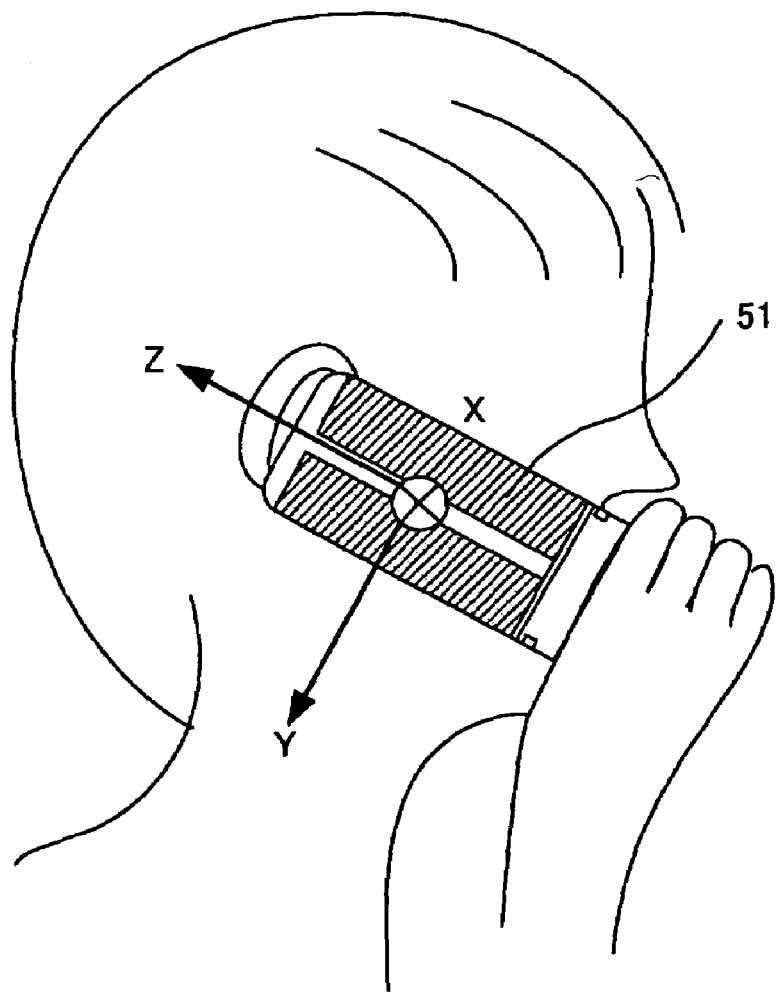
FIG. 2 is a diagram showing a voice communication state of the foldable mobile phone shown in FIG. 1.
Figure 3:
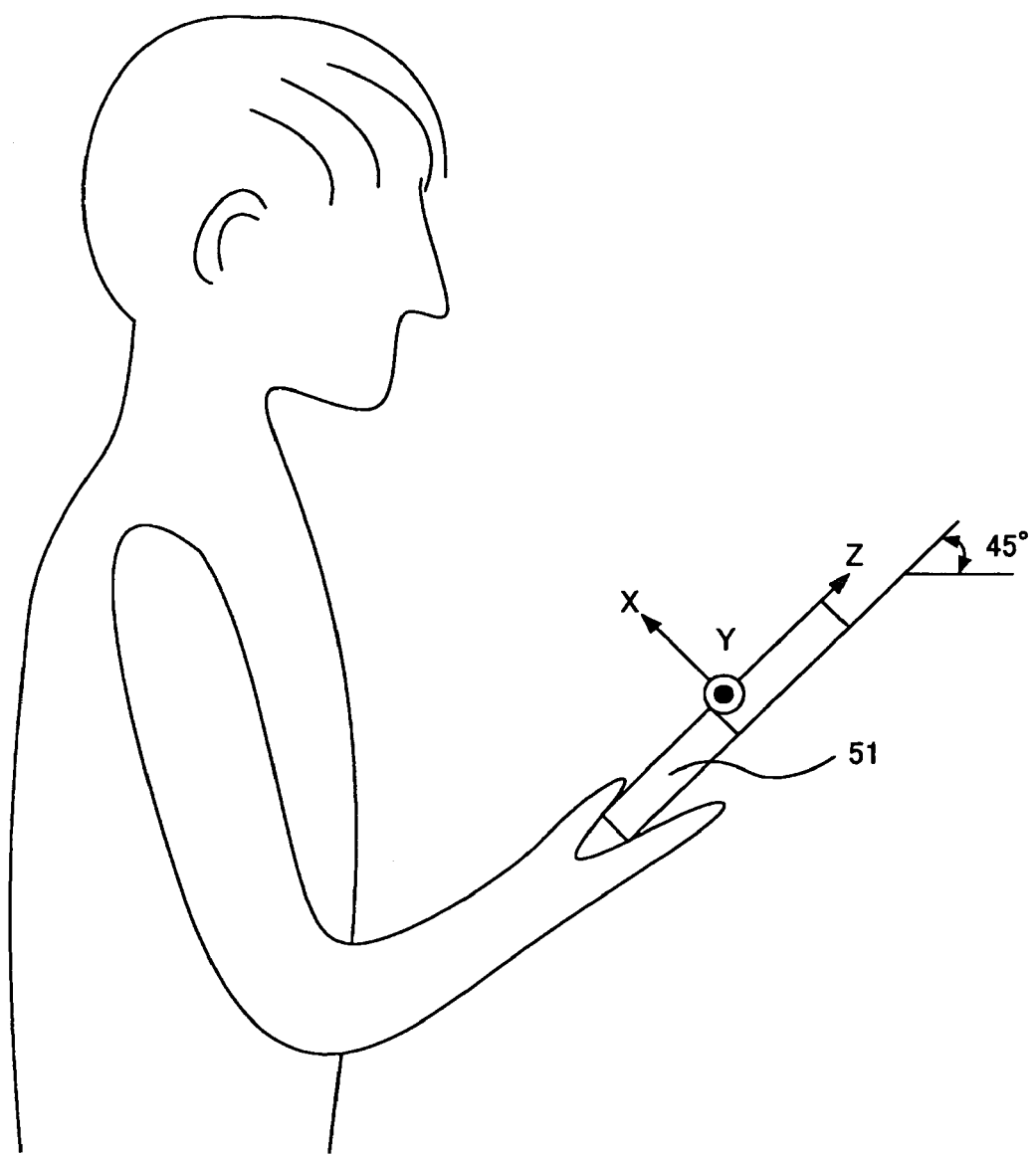
FIG. 3 is a diagram showing an operation state of the foldable mobile phone shown in FIG. 1.

Next, the antenna operations of the foldable mobile phone configured as shown in FIG. 1 is explained. FIG. 2 is a diagram showing a voice communication state of the foldable mobile phone shown in FIG. 1. In other words, FIG. 2 shows a voice communication state in which a user holds foldable mobile phone 51 in the right hand and is carrying out voice communication. FIG. 3 is a diagram showing an operation state of the foldable mobile phone shown in FIG. 1. In other words, FIG. 3 shows an operation state in which the user holds foldable mobile phone 51 in the right hand and performs, for example, email operations in front of the chest. Accordingly, the operations of foldable mobile phone 51 when the operation frequency is set to, for example, 2.14 GHz will be explained with reference to FIG. 1 in correspondence with the use states of the mobile phone as shown in FIG. 2 and FIG. 3, First, in the voice communication state as shown in FIG. 2, the user holds the foldable mobile phone in the right hand and uses it near the ear. At this time, in the coordinate system defined in FIG. 1, the X axis direction (middle finger) is the direction from the front side to the back side of the paper in the figure (that is, the direction toward the user's ear), the Y axis direction (thumb) is the direction toward the user's shoulder, and the Z axis direction (forefinger) is the direction toward the backside of the user, as shown in FIG. 2. Further, when voice communication transmission is performed by foldable mobile phone 51 in the voice communication state as shown in FIG. 2—that is, when the user holds the foldable mobile phone 51 in the right hand and carries out voice communication—gravity sensor 26 detects the angle of foldable mobile phone 51 held in the right hand and transmits a signal to high frequency switch 19 to select flat conductor 4. By this means, the contact of high frequency switch 19 is switched ON so as to feed a high frequency signal to flat conductor 4 via matching circuit 13.

Furthermore, the phase of phase shifter 17 is determined so that the phase of the high frequency signal to be fed to matching circuit 12 (that is, flat conductor 1) from power distributor 18 via phase shifter 17 is delayed by 270 degrees (or advanced by 90 degrees) with respect to the phase of the high frequency signal to be fed to matching circuit 13 (that is, flat conductor 4) from power distributor 18 via high frequency switch 19. Feeding point 14 of flat conductor 3 not selected here has a predetermined impedance including, for example, an infinite impedance in an open state.

Figure 4:
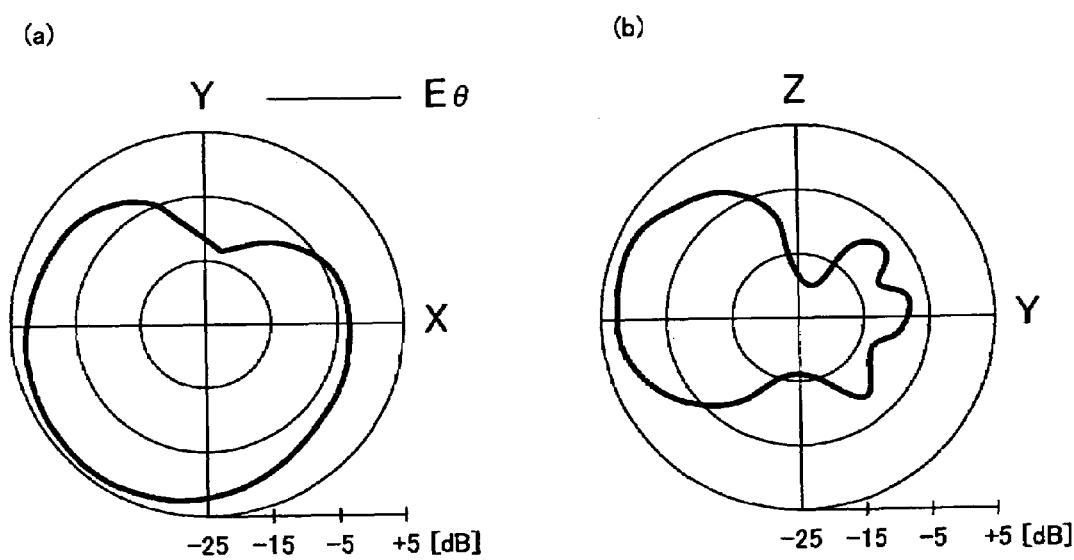
FIG. 4 is a radiation characteristic diagram of the foldable mobile phone shown in FIG. 1.

FIG. 4 is a radiation characteristic diagram of the foldable mobile phone shown in FIG. 1 and shows a radiation characteristic diagram when feeding phase of flat conductor 1 is delayed by 270 degrees with respect to flat conductor 4. FIG. 4(*a*) shows radiation characteristics on the X-Y plane and FIG. 4(*b*) shows radiation characteristics on the Y-Z plane. Concentric circles in FIG. 4 indicate the radiation intensity of radio wave and intervals between the concentric circles indicate the magnitude of 10 dB. In other words, as shown in FIG. 2, with foldable mobile phone 51, by the combination of the antenna element of flat conductor 4 and the antenna element of flat conductor 1 having the phase delayed by 270 degrees from flat conductor 4, the radiation patterns of the radio wave in the coordinate system defined in FIG. 1 have the characteristics shown in FIG. 4(*a*) and FIG. 4(*b*). The radiation patterns shown in FIG. 4(*a*) and FIG. 4(*b*) indicate the vertical polarized components (Eθ) of the radio wave on the X-Y plane and the Y-Z plane.

As shown in FIG. 4(*a*) and FIG. 4(*b*), when flat conductor 4 and flat conductor 1 are selected and the high frequency signal is fed, the antenna directivity is controlled so that the gains in the −X direction and in the −Y direction are high. In other words, in the case of the voice communication state in which foldable mobile phone 51 is held in the right hand as shown in FIG. 2, it is possible to control the directivity of radio wave with respect to the directional direction in the opposite direction to the head side (−X axis direction) and the directional direction in the opposite direction to the shoulder side (−Y axis direction). As a result, radiation efficiency as high as −4 dB is obtained, and it is possible to increase the radiation efficiency up to about 2 dB in the voice communication state compared to the case where the directivity control is not performed.

Further, in the case of the use state of foldable mobile phone 51 as shown in FIG. 2, the radio wave intensity is reduced in the directional direction toward the head side (X axis direction) and the directional direction toward the shoulder (Y axis direction), and, therefore, the influence of radio wave on the human body can be reduced.

On the other hand, when holding foldable mobile phone 51 in the left hand and carrying out the voice communication, from the angle detection result from gravity sensor 26, flat conductor 3 is selected by high frequency switch 19 and feeds signal to matching circuit 11 and the phase of phase shifter 17 is determined so that the phase of the high frequency signal to be fed to matching circuit 12 (that is, flat conductor 1) from power distributor 18 via phase shifter 17 is delayed by 270 degrees (or advanced by 90 degrees) with respect to the phase, of the high frequency signal to be fed to matching circuit 11 (that is, flat conductor 3) from power distributor 18 via high frequency switch 19. In other words, the combination of the antenna element of flat conductor 3 and the antenna element of flat conductor 1 delayed in phase by 270 degrees is selected.

Figure 5:
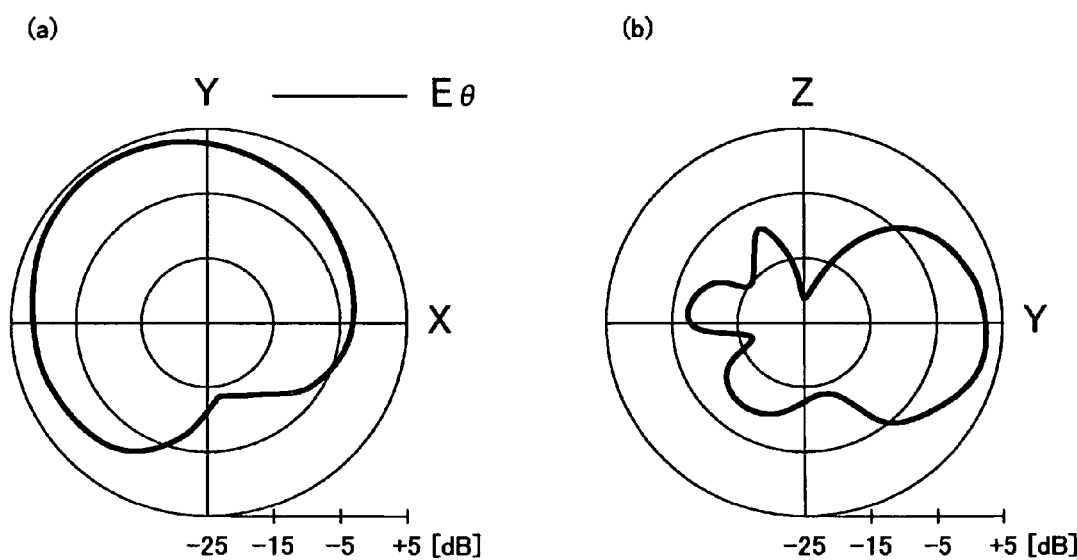
FIG. 5 is a radiation characteristic diagram of radio wave of the foldable mobile phone shown in FIG. 1.

FIG. 5 is a radiation characteristic diagram of the foldable mobile phone shown in FIG. 1, and this radiation characteristic diagram shows when the feeding phase of flat conductor 1 is delayed by 270 degrees with respect to flat conductor 3. FIG. 5(*a*) shows the radiation characteristics on the X-Y plane and FIG. 5(*b*) shows the radiation characteristics on the Y-Z plane. In other words, when the foldable mobile phone is held in the left hand and flat conductor 1 and flat conductor 3 are selected, the radiation patterns in the coordinate system in FIG. 1 have the characteristics as shown in FIG. 5. The radiation patterns shown in FIG. 5 indicate the vertical polarized components (Eθ) on the X-Y plane and the Y-Z plane. In this case, it is possible to control the directivity of radio wave in the −X axis direction and the +Y axis direction. In other words, in the voice communication state in which the foldable mobile phone 51 is held in the left hand, it is possible to control the directivity of radio wave with respect to the directional direction in the opposite direction to the head side (−X axis direction) and the directional direction in the opposite direction to the shoulder side (Y axis direction). As a result, radiation efficiency as high as −4 dB can be obtained, and it is possible to increase the radiation efficiency up to about 2 dB in the voice communication state compared to the case where the directivity control is not performed. Further, also in the case of the voice communication state in which the mobile phone is held in the left hand, as in the case where the mobile phone is held in the right hand, the radio wave intensity is reduced in the directional direction toward the head side (X axis direction) and the directional direction toward the shoulder side (Y axis direction) as shown in FIG. 5, and, therefore, the influence of radio wave on the human body can be reduced.

Next, when reception is performed, signals received by flat conductor 3 and flat conductor 4 are amplified by reception circuit 22 and reception circuit 23, respectively, and are subjected to signal combining in demodulator 24 by assigning the signals with a predetermined weight or adequately adjusting the phase of each of the received signals in accordance with, for example, the reception state from the antenna. Accordingly, the optimum combining reception diversity is performed in accordance with the reception state from the two antennas of flat conductor 3 and flat conductor 4, so that it is possible to improve reception performance and realize high speed transmission in downlink communication.

As described above, with the mobile radio apparatus configured as in Embodiment 1 shown in FIG. 1, in the reception system, high speed transmission in downlink communication can be realized by improving the reception performance by means of the adaptive combining of received signals, and in the transmission system, the excellent communication performance can be ensured by performing the directivity control in the required direction of radio wave in various use states (that is, the voice communication state or the operation state). Therefore, the mobile radio apparatus of Embodiment 1 has a feature of using the reception combining scheme that uses flat conductor 3 and flat conductor 4 and the selection combination feeding scheme that selects either flat conductor 3 or flat conductor 4 in conjunction with the voice communication state and feeds the selected flat conductor (for example, flat conductor 3) and flat conductor 1 by providing a predetermined phase difference, and, by this means, it is possible to realize high speed transmission in downlink communication, and, in addition, ensure high antenna radiation efficiency of radio wave in the required direction by performing directivity control.

Although the reception combining of the mobile radio apparatus in Embodiment 1 is the adaptive combining, however, the combining scheme is not limited to this, and it is needless to say that the same effect as Embodiment 1 can be obtained from any combining scheme including, for example, the maximal ratio combining and the adaptive equalization combining that improve reception performance. Further, although, in Embodiment 1, the foldable mobile radio apparatus is explained as an example, the mobile radio apparatus is not limited to this, and it is apparent that the same function and effect as Embodiment 1 can be obtained from mobile phone having any structure including, for example, a slide-type mobile apparatus and an assembling and fixed type mobile phone.

EMBODIMENT 2

Figure 6:
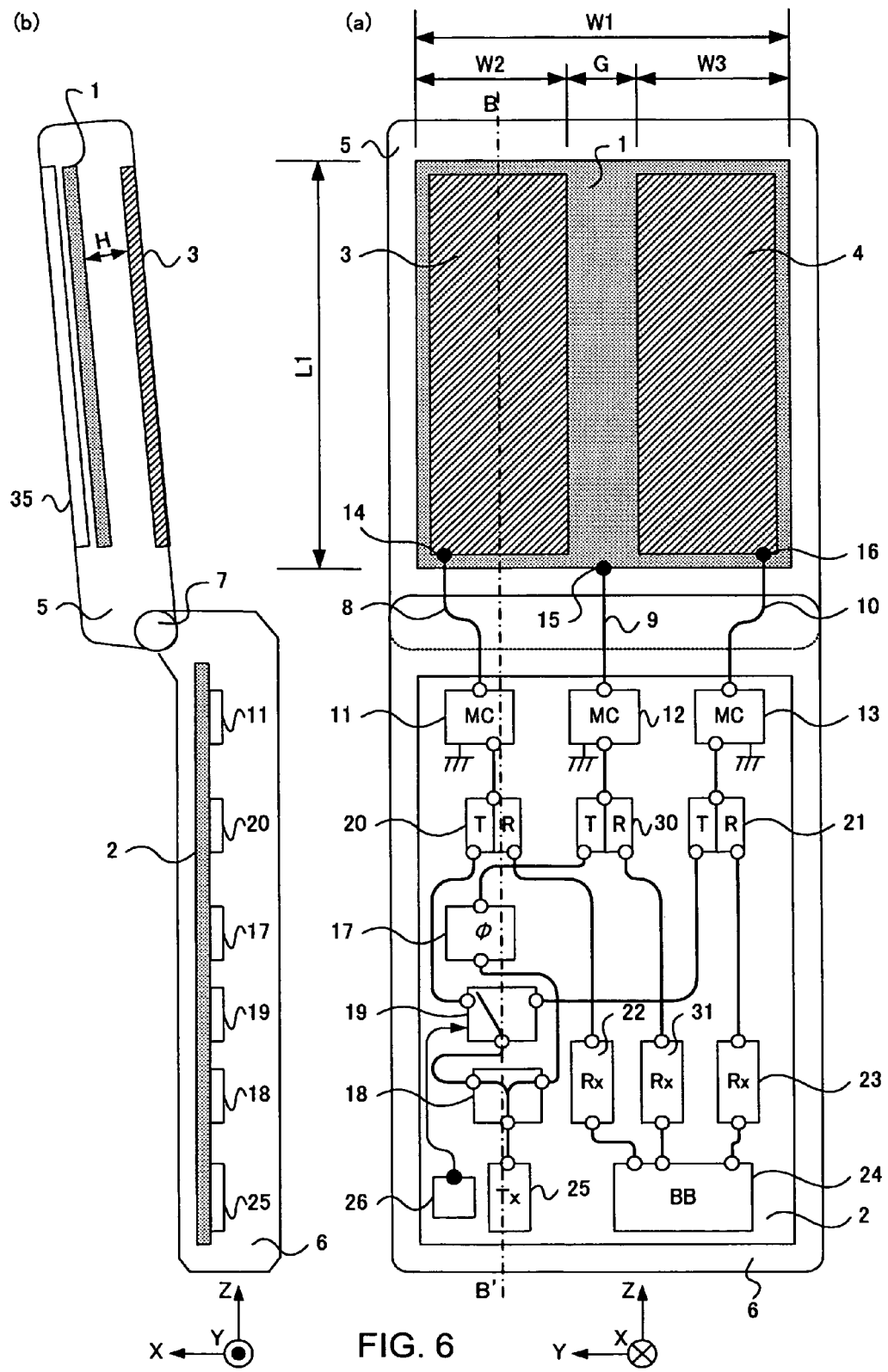
FIG. 6 is a configuration diagram of a foldable mobile phone in embodiment 2 of the present invention.

FIG. 6 is a configuration diagram of a foldable mobile phone in embodiment 2 of the present invention; FIG. 6(*a*) is a back perspective view when the foldable mobile phone is viewed from the backside; and FIG. 6(*b*) is a B-B' section view in FIG. 6(*a*). The mobile phone shown in FIG. 6 is obtained by adding a duplexer 30 to the system of flat conductor 1 and by further adding a reception circuit (reception section) 31 to the reception system of this duplexer 30, compared to the mobile phone shown in FIG. 1. Other components are the same as in FIG. 1 and are assigned the same codes. Therefore, the duplicated explanation will be omitted.

In FIG. 6, a high frequency signal is distributed from transmission circuit 25 by power distributor 18, and one of the distributed signals is fed to flat conductor 1 from matching circuit 12 via phase shifter 17 and duplexer 30. The other is fed to flat conductor 3 from one contact of high frequency switch 19 via duplexer 20 and matching circuit 11 and, is fed to flat conductor 4 from the other contact of high frequency switch 19 via duplexer 21 and matching circuit 13.

On the other hand, in the reception system, a received signal is taken out from the reception side of duplexer 20 via feeding point 14 provided on one end of flat conductor 3 and matching circuit 11, and is amplified by reception circuit 22. Further, a received signal is taken out from the reception side of duplexer 21 via the feeding point 16 provided on one end of flat conductor 4 and matching circuit 13, and is amplified by reception circuit 23. Furthermore, a received signal is taken out from the reception side of duplexer 30 via feeding point 15 provided on one end of flat conductor 1 and matching circuit 12, and is amplified by reception circuit 31. Still furthermore, the received signals amplified by reception circuit 22, reception circuit 23, and reception circuit 31 are assigned a predetermined weighting factor and subjected to signal combining.

Next, although the antenna operations of the mobile phone configured as shown in FIG. 6 is explained, the duplicated explanation will be omitted. When transmission is performed, the same operations as in the above-described embodiment 1 is performed and the same effect can be obtained. On the other hand, when reception is performed, the high frequency signals received by flat conductor 3, flat conductor 4, and flat conductor 1 are amplified by reception circuit 22, reception circuit 23, and reception circuit 31, respectively. Then, the amplified received signals are assigned a predetermined weight in demodulator 24 in accordance with, for example, the reception state from the antenna, and, further, high frequency signal is combined by adjusting the phases of the received signals adequately. The combining reception diversity is therefore performed in accordance with the reception state from the three antennas (that is, flat conductor 1, flat conductor 3, and flat conductor 4), so that it is possible to improve the reception performance and realize high speed transmission in downlink communication.

With the mobile phone configured as Embodiment 2, in the reception system, high speed transmission in downlink communication can be realized by performing adaptive combining of the received signals in the three systems and improving reception performance, and in the transmission system, excellent communication performance can be ensured by performing the directivity control of radio wave in various use states.

As described above, with the foldable mobile phone of Embodiment 2, by using the reception combining scheme that uses flat conductor 3, flat conductor 4, and flat conductor 1, and the selection combination feeding scheme that selects either flat conductor 3 or flat conductor 4 in conjunction with the voice communication state and feeds a signal having a predetermined phase difference to the selected flat conductor (for example, flat conductor 3) and flat conductor 1, it is possible to realize high speed transmission in downlink communication, and, in addition, ensure high antenna radiation efficiency of radio wave in the required direction by performing directivity control.

EMBODIMENT 3

Figure 7:
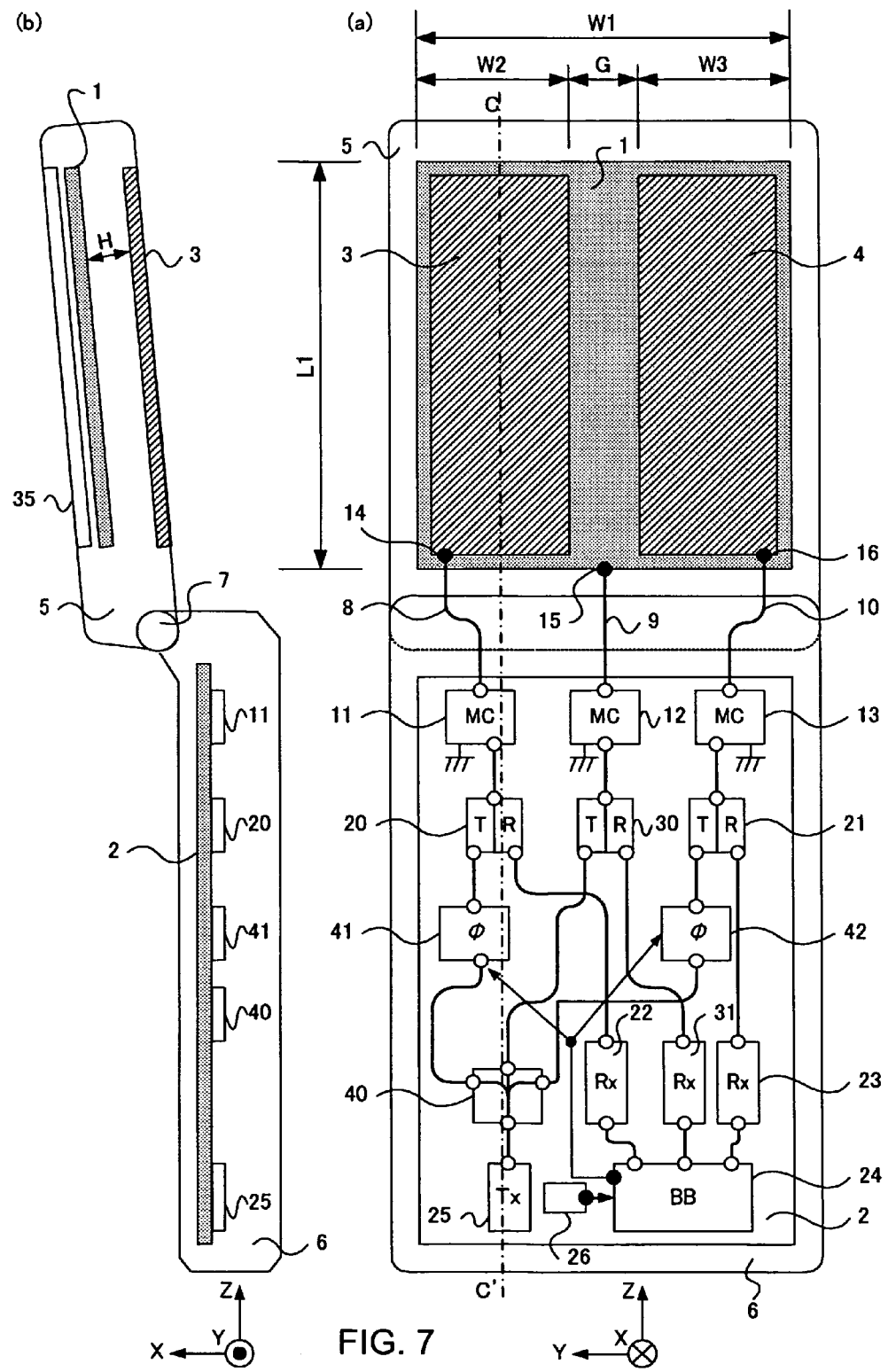
FIG. 7 is a configuration diagram of a foldable mobile phone in embodiment 3 of the present invention.

FIG. 7 is a configuration diagram of a foldable mobile phone of Embodiment 3 of the present invention; FIG. 7(a) is a back perspective view when the foldable mobile phone is viewed from the backside; and FIG. 7(b) is a C-C' section view in FIG. 7(a). The mobile phone shown in FIG. 7 is obtained by deleting high frequency switch 19, power distributor 18, and phase shifter 17 from the mobile phone shown in FIG. 6 and newly adding power distributor 40 for distributing a signal to three systems, phase shifter 41, and phase shifter 42. Other components are the same as in FIG. 6 and are assigned the same codes. Therefore, the duplicated explanation of the mobile phone shown in FIG. 1 and FIG. 6 will be omitted.

In FIG. 7, in the case of the transmission system, a high frequency signal is distributed to three systems from transmission circuit 25 by power distributor 40 and the first system is fed to flat conductor 3 from matching circuit 11 via phase shifter 41 and duplexer 20. Further, the second system is fed to flat conductor 4 from matching circuit 13 via phase shifter 42 and duplexer 21. Furthermore, the third system is fed to flat conductor 1 from matching circuit 12 via duplexer 30.

Figure 8:
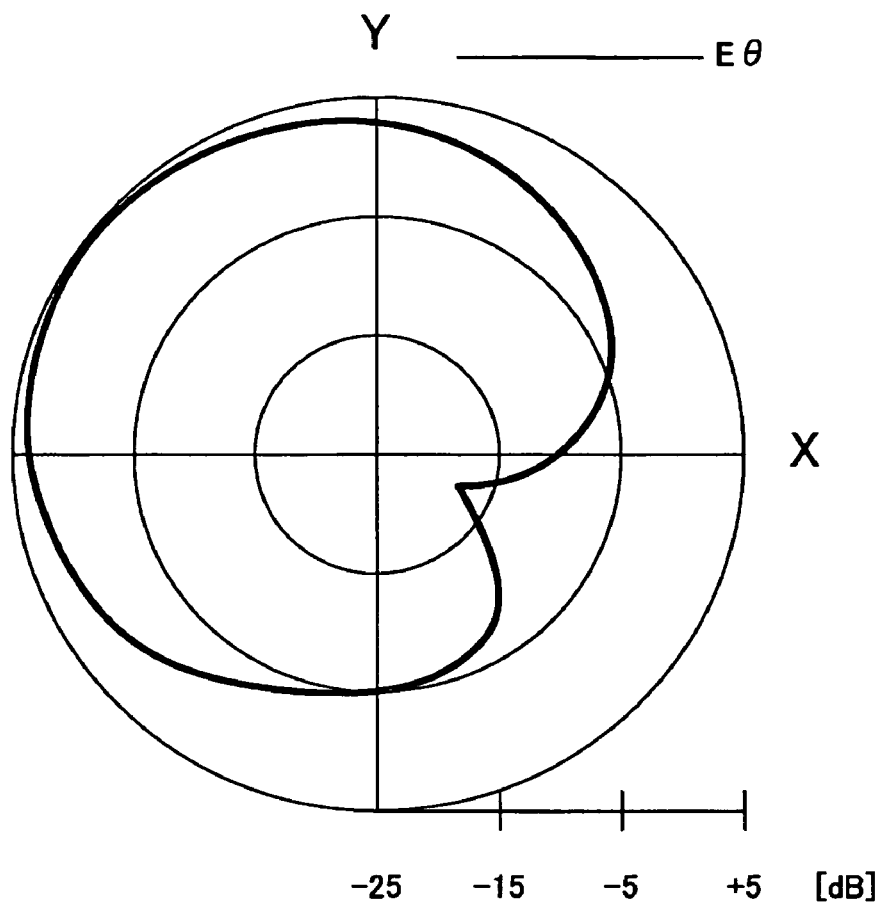
FIG. 8 is a radiation characteristic diagram on the X-Y plane of the foldable mobile phone shown in FIG. 7.

Next, the antenna operations of the mobile phone in Embodiment 3 configured as in FIG. 7 will be explained. FIG. 8 is a radiation characteristic diagram on the X-Y plane of the foldable mobile phone shown in FIG. 7, and shows the radiation characteristics of radio wave when the feeding phase of flat conductor 3 is delayed by 180 degrees with respect to flat conductor 1 and the feeding phase of flat conductor 4 is delayed by 90 degrees with respect to flat conductor 1. In other words, when carrying out voice communication by holding the mobile phone in the left hand, the phases of phase shifter 41 and phase shifter 42 are determined so that the feeding phase of flat conductor 3 is delayed by 180 degrees with respect to flat conductor 1 and the feeding phase of flat conductor 4 is delayed by 90 degrees with respect to flat conductor 1. The signal for performing the control of the phase angle is automatically determined based on the angle information of the mobile phone by gravity sensor 26 when the mobile phone is held in the left hand or the reception level detected by demodulator 24.

The radiation pattern in this case is such that, as shown in FIG. 8, the radio wave in the −X direction (that is, the direction away from the head) has the maximum gain and the radio wave in the +X direction (direction toward the head) has the minimum gain. Further, it is possible to control the directivity of the radio wave in the +Y direction (that is, the direction away from the shoulder). In other words, in the voice communication state as shown in FIG. 2, when the user carries out voice communication by holding the mobile phone in the left hand, it is possible to reduce the radiation in the head direction (X axis direction) extremely and, at the same time, to control the directivity of the radio wave in the opposite direction of the head and the shoulder (that is, the −X axis direction and the Y axis direction). As a result, radiation efficiency as high as −3 dB can be obtained, and it is possible to increase the radiation efficiency by 3 dB in the voice communication state compared to the case where the directivity control is not performed.

Figure 9:
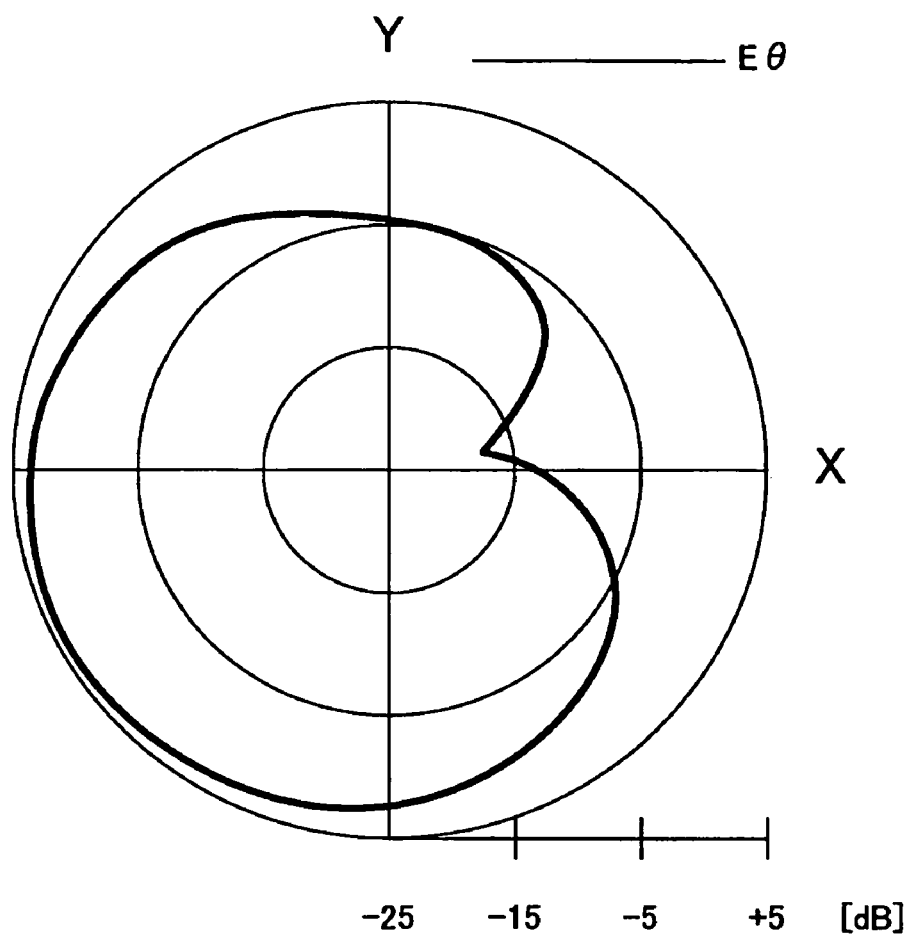
FIG. 9 is a radiation characteristic diagram on the X-Y plane of the foldable mobile phone shown in FIG. 7.

FIG. 9 is a radiation characteristic diagram on the X-Y plane of the foldable mobile phone shown in FIG. 7, and shows the radiation characteristics of radio wave when the feeding phase of flat conductor 3 is delayed by 90 degrees with respect to flat conductor 1 and the feeding phase of flat conductor 4 is delayed by 180 degrees with respect to flat conductor 1. In other words, when carrying out voice communication by holding the mobile phone in the right hand, the phases of phase shifter 41 and phase shifter 42 are determined so that the feeding phase of flat conductor 3 is delayed by 90 degrees with respect to flat conductor 1 and the feeding phase of flat conductor 4 is delayed by 180 degrees with respect to flat conductor 1. The radiation pattern in this case is such that, as shown in FIG. 9, the radio wave in the −X direction (that is, the direction away from the head) has the maximum gain and the radio wave in the +X direction (direction toward the head) has the minimum gain. Further, it is possible to control the directivity of the radio wave in the −Y direction (that is, the direction away from the shoulder). In other words, when the user holds the mobile phone in the right hand as shown in FIG. 2 and carries out voice communication, it is possible to extremely reduce the radiation intensity in the head direction and, at the same time, control the directivity of the radio wave in the opposite direction of the head and the shoulder. As a result, radiation efficiency as high as −3 dB can be obtained, and it is possible to increase the radiation efficiency by 3 dB in the voice communication state compared to the case where the directivity control is not performed.

Figure 10:
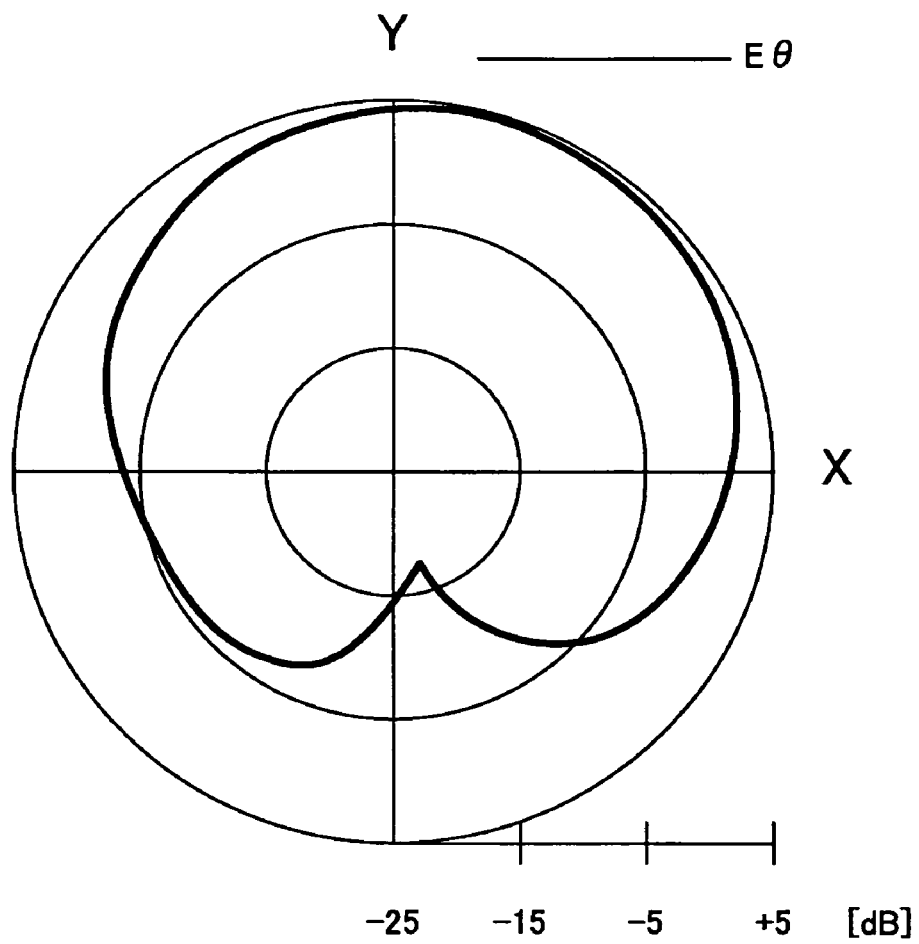
FIG. 10 is a radiation characteristic diagram on the X-Y plane of the foldable mobile phone shown in FIG. 7.

FIG. 10 is a radiation characteristic diagram on the X-Y plane of the foldable mobile phone shown in FIG. 7 and shows the radiation characteristics on the X-Y plane when the phases of phase shifter 41 and phase shifter 42 are determined so that the feeding phase of flat conductor 3 is delayed by 90 degrees with respect to flat conductor 1 and the feeding phase of flat conductor 4 is delayed by 270 degrees with respect to flat conductor 1. As shown in FIG. 10, it is possible to control the directivity of radio wave so that the maximum gain is obtained in the +Y direction in the radiation pattern in the operation state in which the mobile phone is held in the left hand. For example, in the operation state as shown in FIG. 3, when a public base station is in the +Y direction, excellent communication performance can be obtained.

Figure 11:
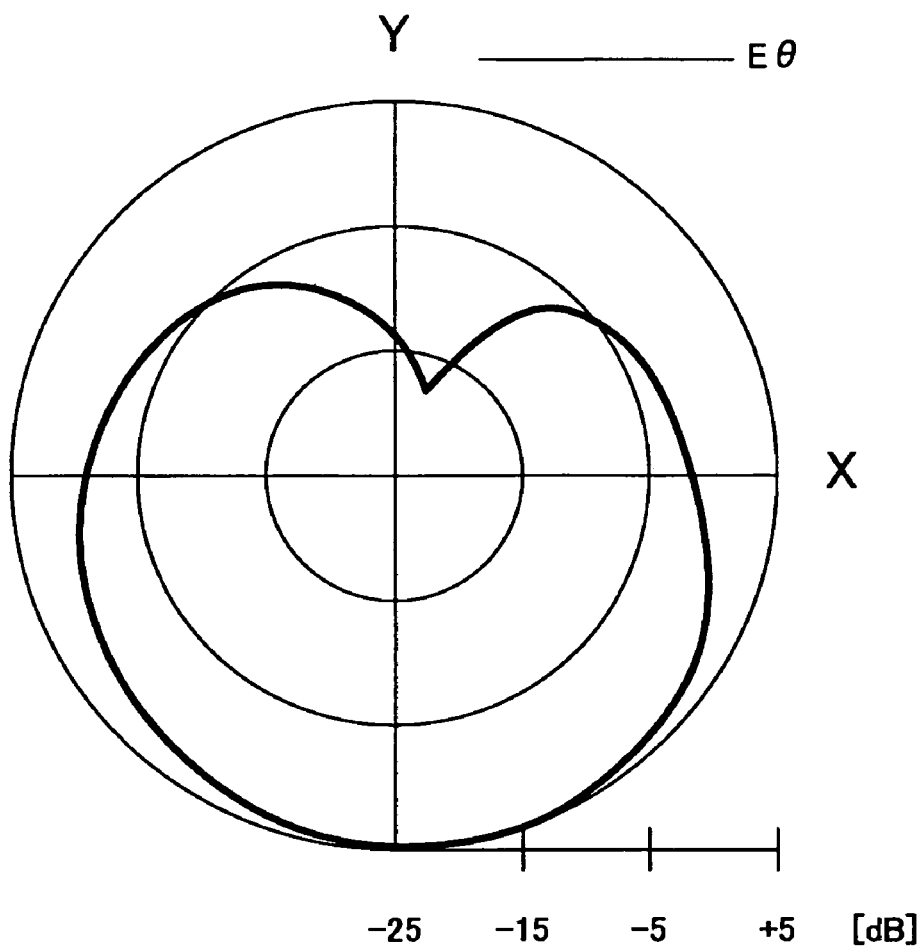
FIG. 11 is a radiation characteristic diagram on the X-Y plane of the foldable mobile phone shown in FIG. 7.

FIG. 11 is a radiation characteristic diagram on the X-Y plane of the foldable mobile phone shown in FIG. 7, and shows the radiation characteristics on the X-Y plane when the phases of phase shifter 41 and phase shifter 42 are determined so that the feeding phase of flat conductor 3 is delayed by 270 degrees with respect to flat conductor 1 and the feeding phase of flat conductor 4 is delayed by 90 degrees with respect to flat conductor 1. As shown in FIG. 11, it is possible to control the directivity of radio wave so that the maximum gain is obtained in the -Y direction in the radiation pattern in the operation state in which the mobile phone is held in the right hand. For example, in the operation state as shown in FIG. 3, when a public base station is in the -Y direction, excellent communication performance can be obtained.

In other words, according to the mobile phone in Embodiment 3 of the present invention, it is possible to control the directivity of radio wave to various directivities by controlling the directivity of radio wave by automatically changing the feeding phase of flat conductor 3 and flat conductor 4 in accordance with the use state and the reception state of the mobile phone. By this means, it is possible to perform the directivity control so that optimum transmission performance is obtained in accordance with the use state of the mobile phone, and, therefore, it is possible to further improve the transmission performance compared to the conventional mobile phone. On the other hand, when reception is performed, by performing the same operation as Embodiment 2, the same effect can be obtained.

With the mobile radio apparatus configured as Embodiment 3, it is possible in the reception system to realize high speed transmission in downlink communication by improving the reception performance by means of adaptive combining of received signals in three systems. Further, in the transmission system, it is possible to ensure excellent communication performance by controlling the directivity of radio wave in various use states.

As described above, with the mobile radio apparatus of the embodiments of the present invention, it is possible to ensure high antenna radiation efficiency in addition to realizing high speed transmission in downlink communication by using the reception combining scheme that uses flat conductor 3, flat conductor 4, and flat conductor 1 of the mobile radio apparatus in the reception system, and by feeding flat conductor 3 and flat conductor 4 with different phases for flat conductor 1 in accordance with the communication state in the transmission system.

The present application is based on Japanese Patent Application No. 2004-162157, filed on May 31, 2004, the entire content of which is expressly incorporated by reference herein.

INDUSTRIAL APPLICABILITY

According to the present invention, in various use states in which the mobile radio apparatus is held in the hand of the user, it is possible to ensure high antenna radiation efficiency in addition to realizing high speed transmission in downlink communication, so that the present invention is by no means limited to the mobile radio apparatus having a folding structure and can be applied to a mobile phone having any structure to improve communication performance.

The invention claimed is:

1. A mobile radio apparatus that performs transmission and reception of radio waves by combining a plurality of antenna elements, the mobile radio apparatus comprising:
    a first antenna element that is arranged along a longer side of a case;
    a second antenna element and a third antenna element that are arranged along the longer side of the case and have different excitation phases from the first antenna element;
    a transmission system control section that controls a pattern of radiation directivity by changing a phase difference between the excitation phase of the first antenna element and the excitation phase of the second antenna element or the third antenna element; and
    a reception system control section that performs adaptive combining of received signals in accordance with a reception state of the first antenna element, the second antenna element, and the third antenna element.

2. The mobile radio apparatus according to claim 1, wherein:
    the transmission system control section comprises:
        a transmission section that is mounted on a substrate provided inside the case and that outputs a high frequency signal;
        a power distribution section that performs power distribution of the high frequency signal output from the transmission section to the first antenna element, the second antenna element, and the third antenna element; and
        a phase shift section that changes the phase difference between the excitation phase of the first antenna element and the excitation phase of the second antenna element or the third antenna element; and
    the reception system control section comprises:
        a plurality of reception sections that are mounted on a substrate provided inside the case, receive and amplify high frequency signals from the plurality of antenna elements contributing to the reception system; and
        a combining section that assigns a predetermined weight to the high frequency signals output from the plurality of reception sections and performs adaptive combining of the signals.

3. The mobile radio apparatus according to claim 2, wherein the plurality of reception sections are configured with three reception sections so as to receive high frequency signals separately from the first antenna element, the second antenna element, and the third antenna element.

4. The mobile radio apparatus according to claim 3, wherein the three reception sections receive high frequency signals separately from the first antenna element, the second antenna element, and the third antenna element via a duplexer for using one antenna element for both the transmission system and the reception system.

5. The mobile radio apparatus according to claim 2, wherein the transmission system control section further comprises a selection switching section that selectively switches distribution routes of the high frequency signal in accordance with a use state of the mobile radio apparatus.

6. The mobile radio apparatus according to claim 5, wherein:
    the transmission system control section further comprises an inclination detection section that detects the use state of the mobile radio apparatus by an inclination angle of the mobile radio apparatus; and the inclination detection section allows the phase shift section to variably control the phase difference according to the detection result of the inclination of the inclination detection section at the phase shift section and allows the selection switching section to selectively switch the distribution routes of the high frequency signal.

7. The mobile radio apparatus according to claim 1, wherein the case has a foldable structure having a mechanism whereby an upper case and a lower case are connected by a hinge section and can be opened and closed, and the first antenna element, the second antenna element, and the third antenna element are arranged along the longer side of the case on the back side of a display section of the upper case.

* * * * *